United States Patent
Robert

(10) Patent No.: US 8,706,593 B2
(45) Date of Patent: Apr. 22, 2014

(54) SYSTEM FOR ACCESS TO AND EXCHANGE OF MARKET DATA

(75) Inventor: René Robert, West Newton, MA (US)

(73) Assignee: Advantage Data Inc., Boston, MA (US)

( * ) Notice: Subject to any disclaimer, the term of this patent is extended or adjusted under 35 U.S.C. 154(b) by 0 days.

(21) Appl. No.: 13/475,615

(22) Filed: May 18, 2012

(65) Prior Publication Data

US 2012/0290503 A1 Nov. 15, 2012

Related U.S. Application Data

(63) Continuation of application No. 09/494,799, filed on Jan. 31, 2000, now abandoned.

(51) Int. Cl.
*G06Q 40/00* (2012.01)

(52) U.S. Cl.
USPC .......................................................... 705/35

(58) Field of Classification Search
USPC ................................................... 705/35–45
See application file for complete search history.

(56) References Cited

U.S. PATENT DOCUMENTS

| | | | |
|---|---|---|---|
| 5,101,353 A | 3/1992 | Lupien et al. | |
| 5,592,375 A | 1/1997 | Salmon et al. | |
| 5,675,746 A * | 10/1997 | Marshall | 705/35 |
| 5,826,244 A | 10/1998 | Huberman | |
| 5,915,245 A | 6/1999 | Patterson et al. | |
| 5,991,751 A | 11/1999 | Rivette et al. | |
| 6,014,643 A * | 1/2000 | Minton | 705/36 R |
| H0002064 H | 5/2003 | Buchalter | |

OTHER PUBLICATIONS

Advantage Data Program: https://www.advantagedata.com/users/program.cfm. Jul. 9, 2003 (1 page).
Advantage Data Invoice #1, Mar. 1, 1999 (1 page).
Advantage Data Investor Write Up, Dec. 1997 (2 pages).
ALLQ, Bloomberg L.P. Jul. 3, 2003 (4 pages).
"Autotrade Electronic Bond Trading Through Bloomberg", UBS Warburg. Circa 2002 (16 pages).
"The Bloomberg Professional Service", Bloomberg LP, 2000 (2 pages).
"Business Plan for Advantage Data", Aug. 11, 1998 (60 pages).
"Capital Access Introduces Histran: An Electronic Historical Transaction Product Profiling U.S. Insurance Company Fixed-Income Trading Activity", Histran Press Release, Jun. 2, 2004 (2 pages).
May, David. "Avoiding an ABS Short-change on the Short End", Bloomberg, Apr. 1999, pp. 75-76, 78 (3 pages).

(Continued)

*Primary Examiner* — Jason M Borlinghaus
(74) *Attorney, Agent, or Firm* — Choate Hall & Stewart LLP; William R. Haulbrook

(57) ABSTRACT

A system and method for real-time access to information and for information exchange regarding securities markets. The system allows access to securities data obtained from multiple sources, and allows a wide variety of data pertaining to a particular security to be simultaneously displayed. The data may further be automatically and continuously updated in real time, and users may contribute securities data to the system. The system further eases the creation of investment portfolios by relieving the user of the need to type bond identification numbers, issue names, coupons, or maturity data when creating and editing a portfolio.

19 Claims, 7 Drawing Sheets

NAVIGATION THROUGH THE HIGH YIELD ADVANTAGE PRODUCT WHICH IMPLEMENTS THE ADVANTAGE SOLUTION TECHNOLOGY.

(56) References Cited

OTHER PUBLICATIONS

"Electronic Trading Will Be a Must" American Banker Bond-Buyer, a division of Thomson Publishing Corporation, Dec. 1, 1997, vol. 4, No. 46. p. 1 (1 page).

FMPS, Bloomberg L.P. Jul. 7, 2003 (11 pages).

"GeoCities IPO Price Tops Forecast As Portal Attracts Strong Demand", Dow Jones Newswires, Aug. 11, 1998 (2 pages).

"GeoCities More Than Doubles in First Day of Trading". Bloomberg, L.P. Aug. 11, 1998, p. 1-3. (3 pages).

Zuckerman, Gregory. "Electronic Trading in Bonds Has Been Slow to Catch on". Wall Street Journal Jun. 3, 1998 (3 pages).

Harmon, Steve. "Good, Bad & Cosmetically Challenged: Internet IPOs Show Strength in Numbers". Internet.com. Aug. 7, 1998 (2 pages).

"Ten Ideas from Portfolio Managers to Municipal Sell Side". BondMarkets, Dec. 1997, p. 9. (1 page).

Bakos, J. Yannis. "A Strategic Analysis of Electronic Marketplaces". MIS Quarterly, vol. 15, No. 3, Special Issue, Sep. 1991 (17 pages).

Bloomberg Market "Core Concepts" online help file: ALLQ <GO>, cited in parent application in 2003-2004 timeframe, date(s) unknown (5 pages).

Lux, Hal. Institutional Investor, vol. 31, No. 12, Dec. 1997 (2 pages).

"Capital Access Selects Mercury Technologies to Build its New Fixed-Income Internet Solution" *The Free Library* Nov. 9, 1999. Jul. 27, 2012 <http://www.thefreelibrary.com/CapitalAccess_Selects_Mercury_Technologies_to_Build_its_New...-a057433601> (2 pages).

\* cited by examiner

SYSTEM FOR ACCESS TO AND EXCHANGE OF MARKET DATA

FIELD OF THE INVENTION

The present invention is related to computer systems which allow users to access and update vital securities market data, and particularly to systems that allow real-time updating and retrieval of commingled data from multiple market data sources.

BACKGROUND OF THE INVENTION

It is well recognized that security and high yield bond prices change constantly. In order to keep up with the changes in the price and demand for securities and high yield bonds, brokers, traders, salespeople, researchers, portfolio managers and other market participants seek up-to-date securities market information. Securities market information aids these market participants in deciding whether to hold, purchase or sell a particular security or high yield bond. Brokers, traders, salespeople, researchers, portfolio managers and other market participants need to know the accurate price and demand for an individual security or high yield bond.

Each individual security or high yield bond is unique. The securities market variables which may affect the price and demand for one particular security may not affect the price and demand for another security. Therefore, it is critical that brokers, traders, salespeople, researchers, portfolio managers and other market participants have access to a wide array of securities market information as quickly as possible.

Securities market information encompasses several types of information that may affect the price or demand of a security or high yield bond. This information may be grouped into three categories: financial, descriptive and market data. Financial data may include information concerning revenue, earnings before interest, tax, depreciation, amortization and special charges (EBITDA), and leverage ratio (Debt/EBITDA). Descriptive data includes, but is not limited to, S&P rating, Moody's rating, amount outstanding, coupon rate, maturity, and related statistics. Market related data includes, but is not limited to, last price, last yield to worst and spread to worst.

A variety of research firms, financial market sources (e.g. NYSE, AMEX, Nasdaq-FIPS), and pricing firms (e.g. Interactive Data Corporation (IDC) and Muller Data) collect securities market pricing and other information. In turn, brokers, traders, salespeople, researchers, portfolio managers and other market participants rely on financial market sources and pricing firms to obtain the latest securities market information collected from that particular source.

Presently, brokers, traders, salespeople, researchers, portfolio managers and other market participants rely principally on each other (other market participants) to determine the fair value of a security or bond via telephonic communication. This method is very time consuming, labor intensive and inexact. In fact, many over-the-counter markets still work as they did over twenty years ago—when a trader or salesperson wants to communicate market information or "color" to his/her co-workers, he/she simply stands up and shouts it to his co-workers. This method of obtaining and sharing securities market information is also limiting because brokers, traders, salespeople, researchers, portfolio managers and other market participants may only obtain a limited amount of information from the limited number of people that he/she can manually query. Further, brokers, traders, salespeople, researchers, portfolio managers and other market participants must contact several different sources to obtain different types of securities market information. This type of researching can take hours, or even days, which creates the possibility for extremely costly lost opportunities within financial markets.

Currently, there are three major purveyors of financial information concerning securities on the basis of installed terminals: Reuters, Bloomberg, and Bridge. All three services offer Internet-based versions of their products. These services allow their users access to certain types of financial information that is maintained within their system. However, these services are limited in their ability to display financial information concerning a particular security, because they only display information from one pricing source at a time. A broker, trader, salesperson, researcher, portfolio manager or other market participant that uses one of these services would have to conduct multiple time consuming searches to obtain different types of pricing and descriptive information. Also, these three sources do not display co-mingled pricing information.

In today's fast pace securities and high yield bond markets, the challenge for brokers, traders, salespeople, researchers, portfolio managers and other market participants is to obtain all available securities market information as quickly and efficiently as possible. Although a number of patents, such as U.S. Pat. No. 5,101,353, to Lupien et al., U.S. Pat. No. 5,915,245, to Patterson, Jr. et al., U.S. Pat. No. 5,826,244, to Huberman, U.S. Pat. No. 5,991,751 to Rivette et al., and U.S. Pat. No. 5,592,375 to Salmon et al. disclose automated systems for trading and valuing securities, the above-mentioned patents do not provide access to a variety of securities market information in one centrally located storage system. The current invention allows brokers, traders, salespeople, researchers, portfolio managers and other market participants to access and search, in one central standardized database, securities market pricing, descriptive and financial information from a variety of external and internal (via "groupware" features) sources in real-time, thus quickly providing brokers, traders, salespeople, researchers, portfolio managers and other market participants with critical information.

SUMMARY OF THE INVENTION

It is an object of the present invention to provide an on-line computer server for collecting from multiple sources, storing and retrieving securities market information in real-time.

It is a further object of the invention to provide a system for automatically updating securities market information in real-time without human intervention.

A system according to the invention preferably maintains communication links with many external sources that contribute data to the storage system. The external sources contribute data every continuously and whenever available via the communication link (e.g., the Internet). Some external sources contribute data continuously (via datafeeds), while others contribute data via batch file updates and some data may be entered by hand. The system also allows end users (e.g. clients) to contribute securities market information in real-time. Once users or external sources contribute data, older data within the storage system is stored in a historical database. This allows the storage system to maintain current securities market information while also allowing client users to search through the historical database.

A further object of the invention is to provide a system to conduct multiple, ongoing searches of securities market information and display the search results virtually instantaneously, with real-time updating. Thus, the server allows users to conduct continuous and automatic searches of securities market information stored in the storage system. Once a user queries the storage system for securities market information, the controller means searches for the information requested by the user. The controller means then provides the available securities market information to the user by displaying the information on the user's computer monitor.

It is another object of the invention to allow users of the system to submit and share securities market information with each other in real-time and to display different types (e.g. pricing and research notes) of information simultaneously. The system, by querying the central database, constantly maintains internal communication links with other users that allow them to contribute data to and view data from the storage system. Users may contribute data whenever they are logged-on to the server via the communication link (e.g., their Internet browser). Once users contribute data to the storage system and elect to share the data with their clients, the system updates the securities market information being displayed on client users' screens immediately. The system also may allow client users to forward "attachments" (such as spreadsheets, word documents, and other related files) to other users in their group or client users.

It is a further object of the invention to provide a system for users to respond to bids or offers in real-time. This system allows users to view all current bids and offers from either external sources or other users in real-time in a co-mingled fashion. A user may elect to respond to a bid or offer by pressing the "Reply" button on the control panel or input region on the computer screen. Once a user presses Reply, the user may either make a bid or accept an offer. Client users can respond to bids or offers in real-time, as soon as they press the Reply button.

It is a further object of the invention to provide a system for users to create, maintain, edit and update their own investment portfolios in real-time and without having to enter bond identification numbers, issue names, coupon and maturities. The portfolio system queries the central storage system to deliver the most recent pricing information, among all available sources for that portfolio. Once logged-on to the server, users are able to access their own portfolios as well as those from his/her group. Each user is allowed to create, maintain or edit his or her own investment portfolio or those of his/her group.

BRIEF DESCRIPTION OF THE DRAWING

The invention is described with reference to the several figures of the drawing, in which.

FIG. 3 is a computer monitor screen depicting the Individual Security Search Screen.

FIG. 4 is a computer monitor screen depicting the Multi-Search Input Screen.

DETAILED DESCRIPTION

Figure 1:
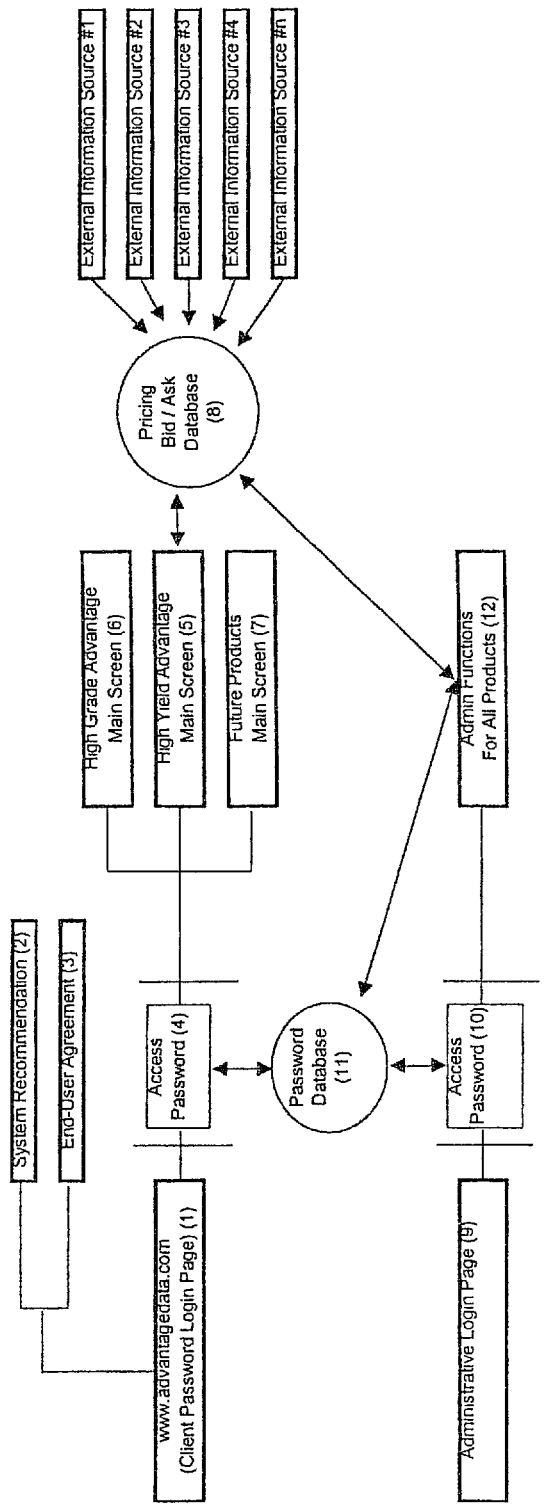
FIG. 1 is a block diagram of the system and displays pathways for navigation throughout the system.

The present invention concerns an on-line computer system and method for collecting from multiple sources, storing and retrieving securities market information in real-time. This system includes a mode for collecting and storing the information and another mode for accessing, searching and organizing the information. The system maintains a storage system, where securities market information is collected and stored in one central database. The database may then be accessed and queried by a user and the results of the query displayed on a computer monitor. Thus, the invention allows users real-time access to different types of securities market information, including, but not limited to, financial, descriptive and market-related information. In particular, pricing information can be displayed simultaneously with other types of related information (e.g. research, notes, descriptive and financial) concerning a particular security or group of securities.

To appreciate the details surrounding the present invention, a review of the nomenclature employed in the securities market is offered. The following terms are used with the following definitions:

Bid—dollar amount offered to purchase a security or bond.
Offer—dollar amount offered to sell a security or bond.
Spread—difference between a bid and offer on the market.
Issue—the securities of a particular company, or the act of distributing the company's securities.
Investment portfolio—the securities held by an individual or institution, which may comprise securities and bonds.
Over-the-counter-markets—markets for securities that are traded but not on a regulated exchange.
AMEX—American Stock Exchange.
Coupon—contractual rate of interest on a bond or similar security.
Call Date—date on which a bond or preferred stock may be redeemed by the issuer before maturity.
Call Price—price at which a bond or preferred stock with a call provision or call feature can be redeemed by the issuer.
Cusip—the alphanumeric coding system for securities.
Yield—rate of return on an asset.
Spread—the difference between the bid and the offer. Alternatively, the difference between the yield of a bond and the U.S. Treasury bond yield with identical maturity.
Underwriter—Investment firms that are responsible for the release of a security.
Currency—form of money that is in public circulation.
Tax Status—the determination of whether a fee is charged by a government on a security and the amount of the tax.
Announcement Date—the date upon which a company announces the date and amount of the next dividend payment.
Collateral Type—the type of assets pledged by a borrower to secure a loan or credit.
Last Price—the latest or most recent price for a security.
Last Source—the source from which the last price came.
Last YTW—the yield to worst for the last price.
Last STW—the spread to worst for the last price.
Yield to Worst—lowest of all yields that would be realized in the event that a bond were redeemed by the insurer at the call price/date or maturity price/date that results in the lowest yield.
Spread to Worst—the yield at the call price/date or maturity price/date which produces the lowest difference between the yield of the security and its corresponding U.S. Treasury bond yield with identical maturity.
SIC—Standard Industrial Classification, the 4 digit code used to characterize business activities.
SIC description—describes the SIC code.

Months Since Issuance—the number of months after the date a security is issued.

Price at Issuance—the price of a security at which it was first issued.

Yield at Issuance—the annualized rate of return on a fixed income security on the date of issuance.

Spread at Issuance—difference between the yield of a bond at issuance and the U.S. Treasury bond yield with identical maturity.

Months to Maturity—number of months to the date on which a security becomes due.

Moody's Rating—a measure of a security's risk, published by Moody's Rating Service.

S & P Rating—a measure of a security's risk, published by S & P Rating Service.

Coupon—the interest payment rate on a fixed income security which is determined upon the issuance of the security.

Callable—redeemable by the issuer before the scheduled maturity.

Refunding Date—date upon which a company issues a bond in order to retire an existing bond.

Security—an investment instrument issued by a corporation or government which offers a debt or equity.

Bond—a debt instrument (a.k.a "fixed income security") issued for a time period of more than a year with the purpose of raising capital for the issuer.

Put Feature—ability of a security holder to force the issuer to redeem a security upon certain conditions being met.

Nominal Value—value of a security at maturity.

Exchange—an organization or association that provides a marketplace for trading securities.

For greater understanding, the invention will be described with respect to a particular preferred embodiment shown in the Figures. However, this description should not be construed to limit the scope of the invention, which is defined by the claims.

The current invention utilizes a central storage system, as shown in FIG. 1. The storage system collects securities market information concerning a security or high yield bond from a variety of external sources and stores the data in one centralized database. The database maintains a communication connection with external sources, which enables the external sources to contribute securities information in real-time, or in batch processes. Once linked to the storage system, the external sources contribute and update their particular securities market information in real-time or in batch processes to the storage system, in some cases completely automatically and in other cases, with human intervention.

Multiple external sources contribute securities market information to the central storage system. The external sources may include, but are not limited to the following: Fixed Income Pricing Reporting Authority (FIPS), New York Stock Exchange (NYSE), Amex-Nasdaq (AMEX), Muller Data (Muller), Interactive Data Corporation (IDC), ADI Institutional Pricing, ADI End of Day Pricing (ADI). These external sources are preferably able to communicate directly with the storage system. They are also able to update their information submitted to the storage system.

Securities market information may also be contributed to the storage system by users of the system. In preferred embodiments, information from external sources and/or users is collected via the Internet. The storage system automatically updates the end user's screens with the information submitted by either external source or users as this information is contributed to the storage system.

The storage system also maintains security identifiers, which identify every bond or security within the server. The security identifier allows the storage system to group different types of information (descriptive, financial and market related) pertaining to that particular security (e.g., price, spread to worst, yield to worst). In turn, the security or bond identifier allows users to retrieve information pertaining to a particular security or bond when the user executes a search.

The storage system may also track all information submitted by both external sources and users in order to track who submitted the information, what group/company they are from and whether the user wishes to allow others outside his or her group to view this information. This functionality makes up the invention's "groupware" feature.

The storage system also maintains securities market information identifiers for different types of securities market information. The securities market identifiers allow the storage system to group different types of information (e.g. pricing, descriptive, financial information) pertaining to that particular security.

The controller means also allows users to access and search the storage system in real-time. Once users log-on to the server, they may retrieve and view all the securities market information within the storage system. Users may access securities market information within the storage system by conducting either a query for a particular security or high yield bond or conducting a query for a range of securities market information (e.g. a portfolio search, all bonds with $100 Million outstanding or greater).

When a user submits a query in the Individual Security Search Mode (FIG. 3), the storage system conducts a search for all the information pertaining the bond's identifier. In this type of search, the user selects a bond or security in the control panel, which the controller means identifies by its corresponding bond or securities identifier. Once the user presses the search button, the controller means conducts a search of all the different information within the storage system that contains the bond or securities identifier.

The system searches all the information within the system, and displays the results on the computer screen. In preferred embodiments, the display information is updated via continuous queries to the database. By "continuous" queries, queries having a frequency of a few seconds, or a few minutes, are contemplated.

The storage and controller systems operate in conjunction with each other to ensure that users have access to securities market information in real-time. In doing so, the storage system maintains a bi-directional communication link with users. The bi-directional communication link allows users to conduct searches of data stored in the storage system and allows users to contribute securities market information to the storage system in real-time. Users may submit securities market information and text to the storage system and choose to share it with other users.

The controller means provides users with instantaneous access to data stored in the storage system and allows users to conduct different types of search queries, including, but not limited to, interactive broker screen (whereby brokers and buy-side clients can communicate with each other and even transact the purchase and sale of securities) queries, individual security searches; and multi-searches. The results from the searches are retrieved in real-time and displayed simultaneously on a computer monitor.

Figure 2:
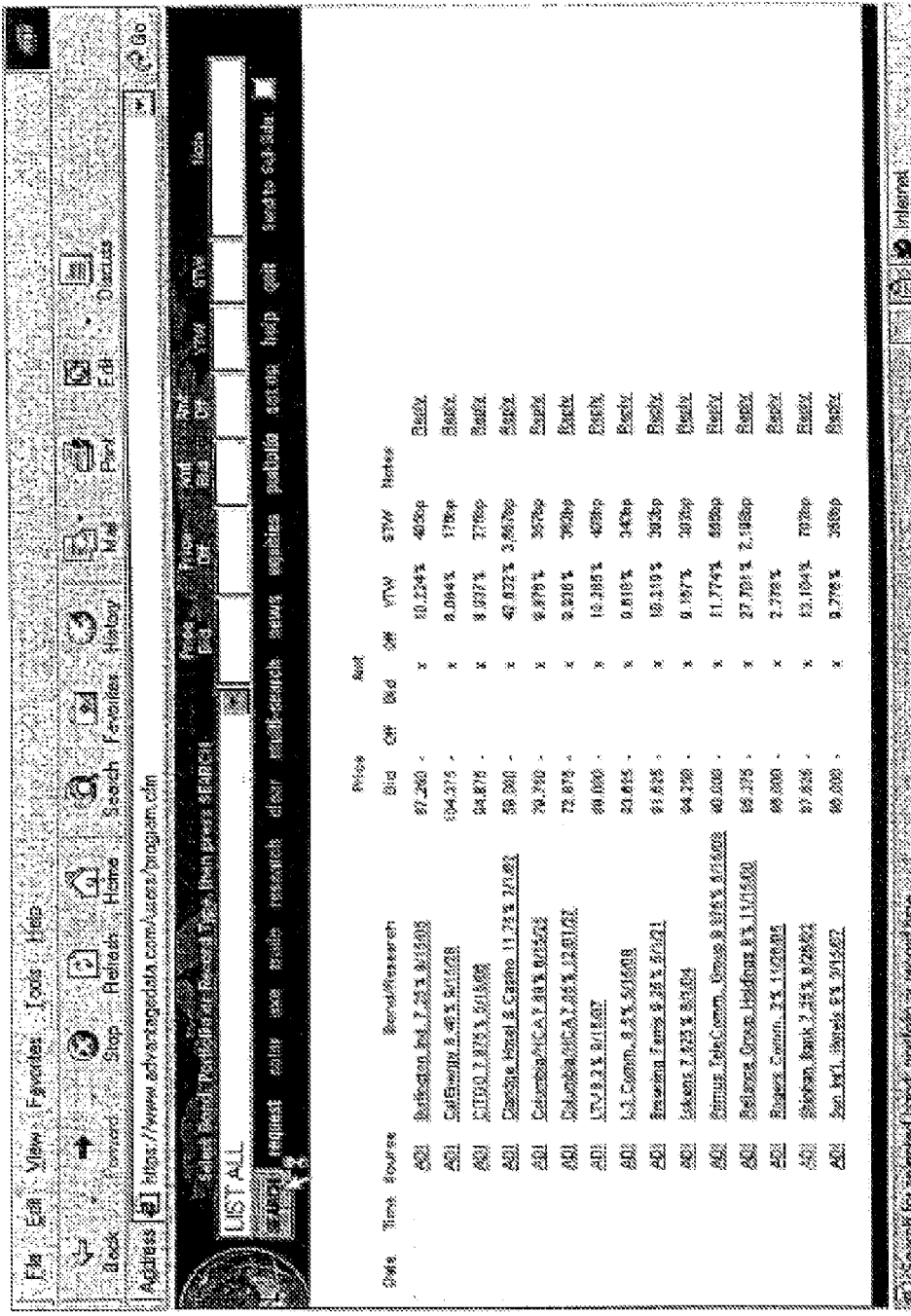
FIG. 2 is a computer monitor screen depicting the Main Screen/Interactive Broker Screen.

FIG. 2 provides a view of a computer screen displaying the Main Screen/Interactive Broker Screen which updates automatically as information is added to the system. Once a user logs on to the server, he or she enters this screen. The Main Screen/Interactive Broker Screen serves as an interactive real-time "broker-screen" for securities and high yield bonds. The screen is split into two frames. The top frame is a control panel or input region. The lower frame is the result or output region. From the Main Screen/Interactive Broker Screen, users use a limited number of keystrokes or clicks of a mouse to retrieve information from the storage system.

On the Main Screen/Interactive Broker Screen, users may obtain securities market information concerning securities and high yield bonds from the external sources that contribute data to the storage system as well as other users/firms on the system that entitle them to their pricing data, research, notes and attachments. Users may also submit securities market information to the storage system and share it with other users if they wish. The Main Screen/Interactive Broker Screen updates automatically in real-time as users and the external sources contribute data.

The Main Screen/Interactive Broker Screen allows users to click on or select a security or bond and quickly obtain securities market information for that particular bond or security. The screen also allows users to make a bid, make an offer, or respond to a bid or offer. Users select "Reply" in order to respond to a bid or offer. By selecting Reply, the controller system searches the storage system and obtains all the securities market information concerning the initial bid or offer in the lower frame so that users may view, edit and "reply" to the sender in real-time.

In the example of FIG. 2, the user requested to "list all" available pricing, research, notes, attachments and other information then presses the search button. In this example, the controller mode will display the date, time, source, bond/research (and attachments), bid prices, ask price, bid amount, ask amount, yield to worst, spread to worst, and any notes that have been entered into the system by users or external sources concerning securities or high yield bonds. This screen updates in real-time throughout the day as information is contributed by users and external sources. Once the user executes the search, the controller means collects all the relevant pricing information within the storage system and displays the information on the computer screen. This screen has the ability to update automatically as new information is contributed to the system by either external sources or users. Currently, commonly used data is cached to speed response by the system.

Figure 3:
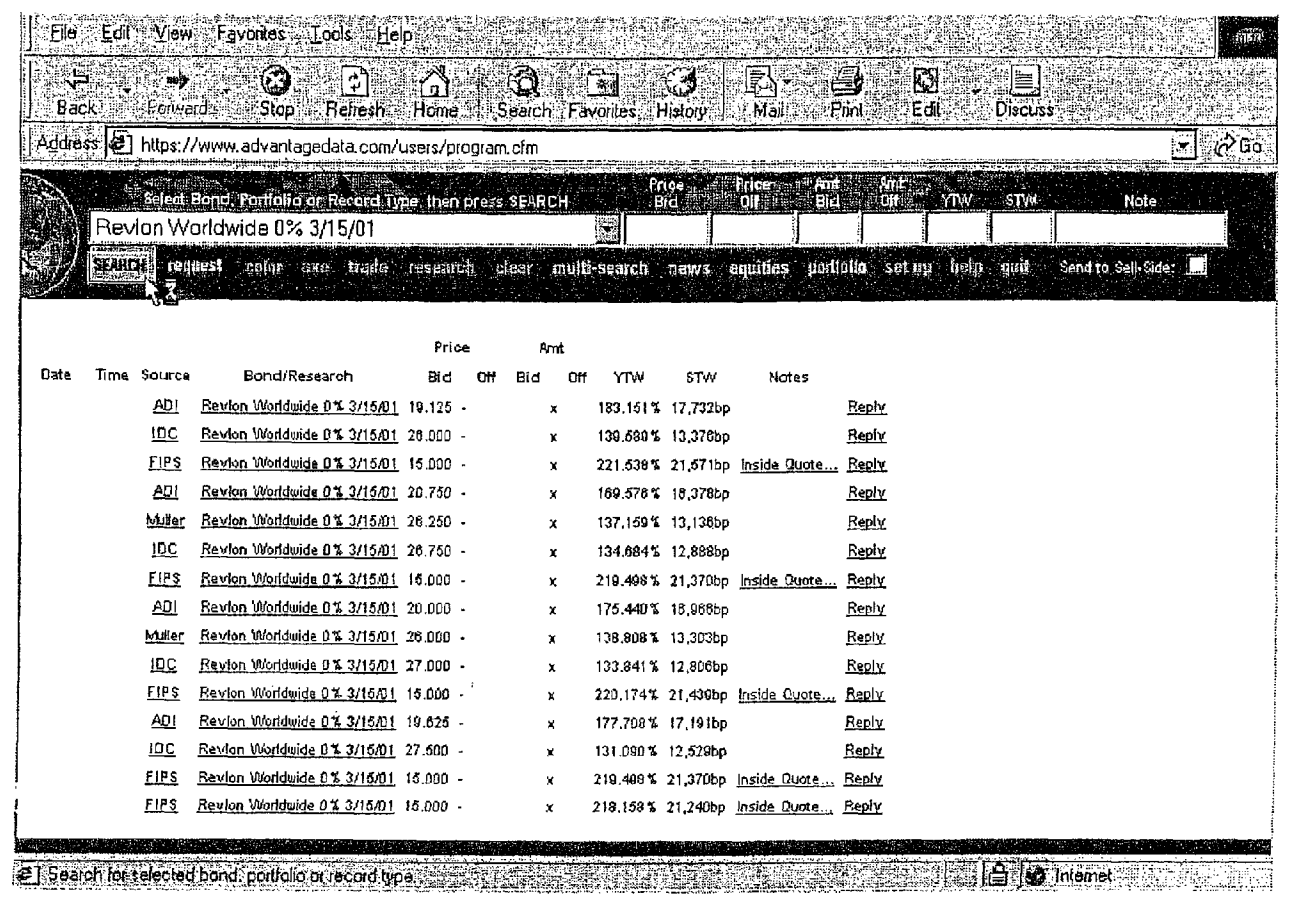

From the Main Screen/Interactive Broker Screen, users may choose to select a security or high yield bond from the top-frame pull-down menu. By selecting a security or bond, users will be forwarded to the Individual Security Search Mode Screen. This screen is shown in FIG. 3. The Individual Security Search Mode Screen allows users to select, search and view all available pricing, yield, spread, research, notes and attachments concerning the selected security or bond. The results of the search are updated automatically as new information is contributed by either external sources or other users. This screen also allows users to respond to a bid or offer. Users select "Reply" in order to respond to a bid or offer from another user. By selecting "Reply", the storage system automatically obtains and places all the securities market information concerning the initial bid or offer in the top toolbar so that the user may view and reply (edit) the information.

In the example of FIG. 3, the user requested the available pricing information concerning Revlon Worldwide 0% Mar. 15, 2001. This request provided the date, time, source, bond/research, bid prices, offer price, bid amount, offer amount, yield to worst, spread to worst, and any research, notes and attachments that have been entered into the system by other users or external sources concerning Revlon Worldwide 0% Mar. 15, 2001. The user presses the search button to execute the search. Once the user presses the search button, the controller means recognizes Revlon Worldwide's bond or securities identifier and searches the storage system for all pricing information pertaining to its bond identifier. The results of the search are displayed on the computer monitor. The system has the ability to update automatically as new information is contributed to the storage system and will also display the new information on the computer monitor.

From the Main Screen or the Individual Security Search Mode Screen, users may select the "multi-search" category to search all available securities market information. By selecting the multi-search function, the user will be forwarded to the Multi-Search Capability-Input Screen shown in FIG. 4. The Multi-Search Capability-Input Screen allows users to quickly and easily obtain securities market information by conducting a wider search of the storage system. The search parameters include, but are not limited to, the following types of securities market information: Issue, Collateral Type, Last Price, Last YTW, Last STW, Last Source, SIC Code, SIC Description, Amount Issued (M), Amount Outstanding (M), Announcement Date, First Settlement Date, Months Since Issuance, Interest Accrue Date, First Coupon Date, Maturity Date, Months to Maturity, Moody's Rating, S&P Rating, DCR Rating, Fitch, Price at Issuance, Yield at Issuance, Spread at Issuance, Underwriter, Issuer, 144A/Public, Coupon, Coupon Frequency, Coupon Type, Callable, Market Issued, Exchange, Nominal Value, Currency, Tax Status, Day/Count, Refunding Date, Current Call Date, Current Call Price, Next Call Date, Next Call Price, Put Feature, Cusip, the user's and user's group's portfolios and others. Users are also able to sort the results on any output field of information obtained from the search in an ascending or descending manner.

Figure 5:
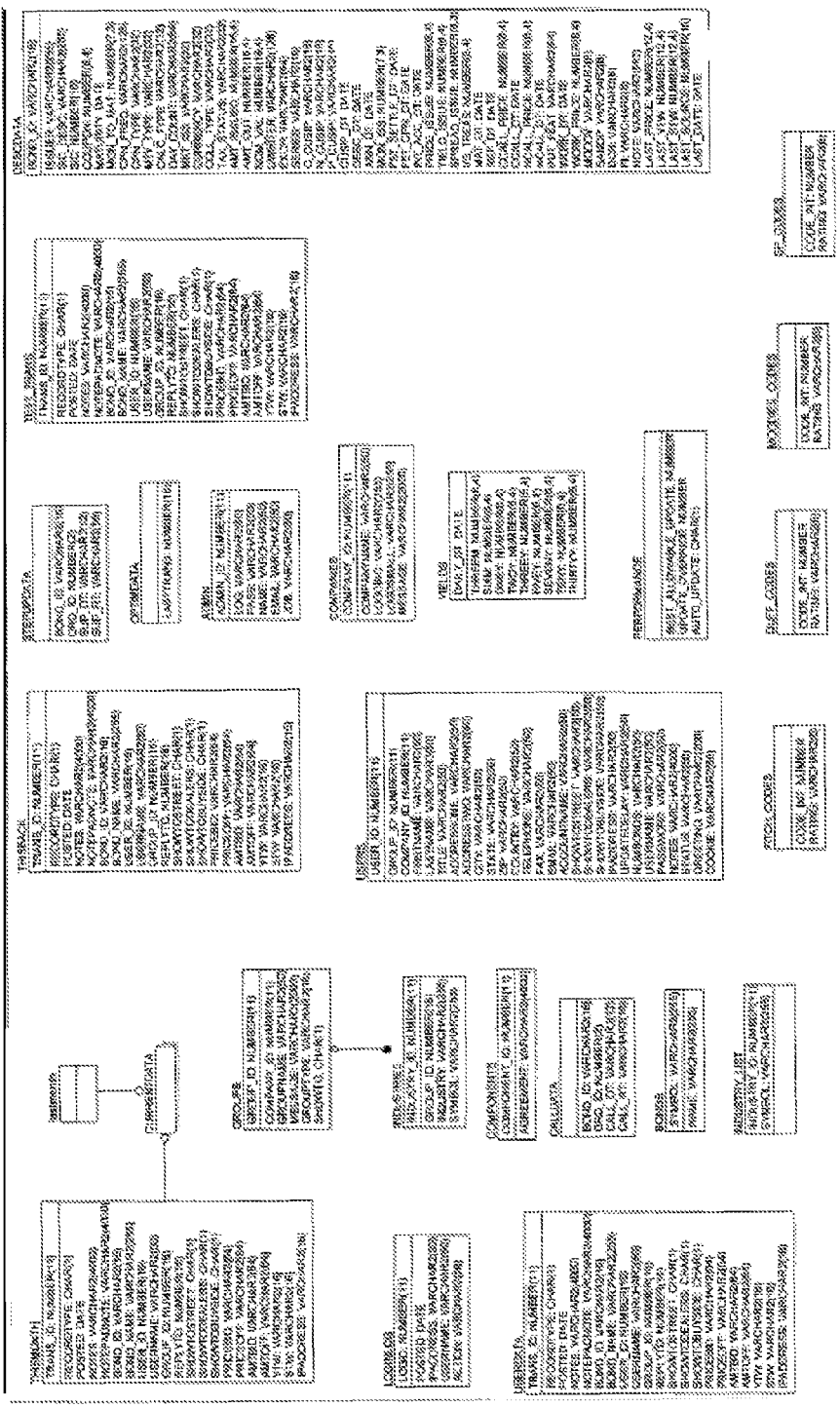
FIG. 5 is a database structure table for a database according to the invention.

A typical database structure used to implement data storage and querying is shown in FIG. 5. Each table in the database contains fields and datatypes; common fields in different tables of the database link the tables together. For example, in the USERDATA table which is indexed by TRANS_ID (transaction ID), the BOND_ID field relates back to the DESCDATA (description data) table, which contains information about each bond. Fields may be linked in a one-to-one or a one-to-many relationship. The THISMONTH table contains cached data corresponding to requests from the last month, which is expected to be most frequently requested. The time period for caching may also be measured in number of requests, rather than number of days (e.g., the table may contain data from the last 60 requests). In the embodiment shown, the THISMONTH table also has a backup table entitled THISBACK.

Figure 6:
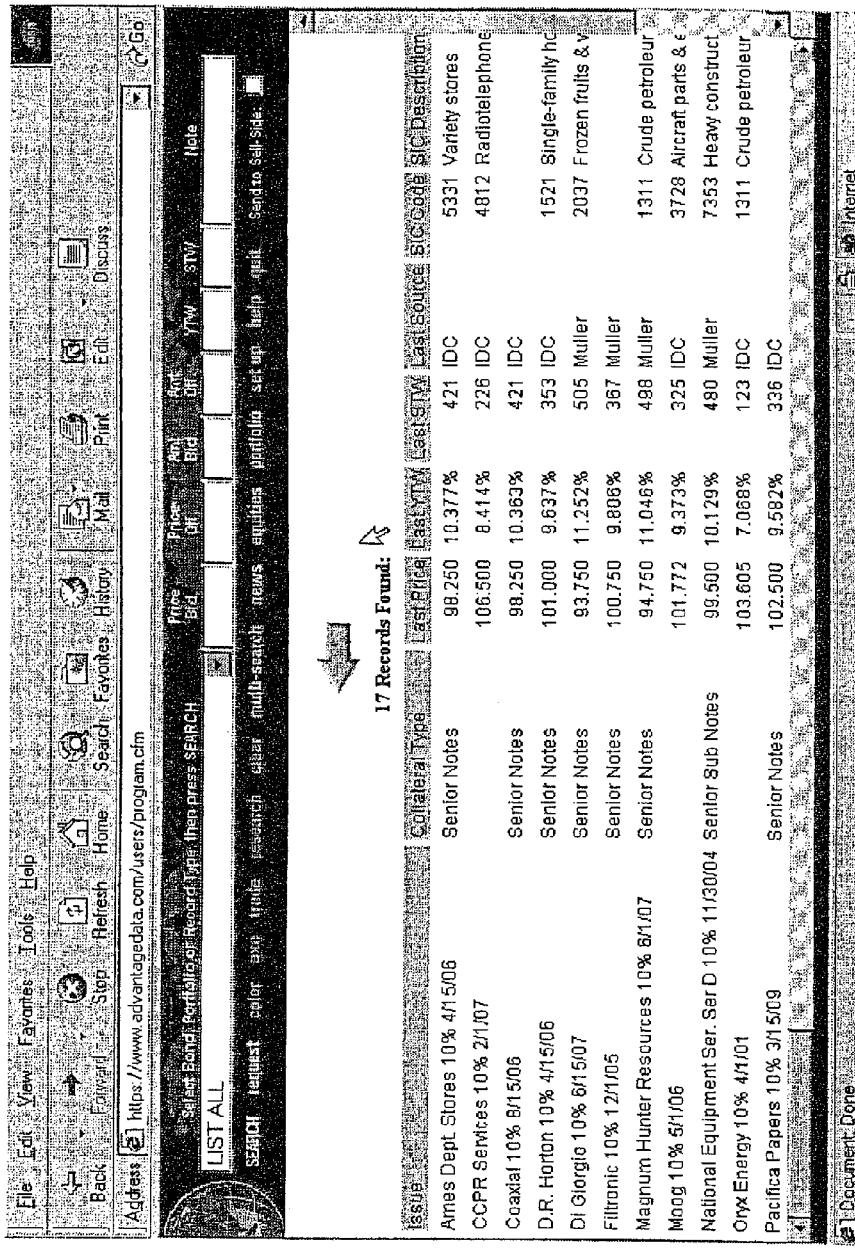
FIG. 6 is a computer monitor screen depicting the Multi-Search Output Screen.

Once the user selects the type of securities market information they wish to obtain from their query, the user simply selects "Perform Search". After selecting Perform Search, the controller means identifies the securities market identifiers which meet the conditions of the user's multi-search and then searches the storage system for information pertaining to that particular security or bond. Once the search is complete, the user is transferred to the Multi-Search-Output Screen shown in FIG. 6. The Multi-Search-Output Screen displays the securities and high yield bonds that correspond to the search criteria selected by the user.

Figure 4:
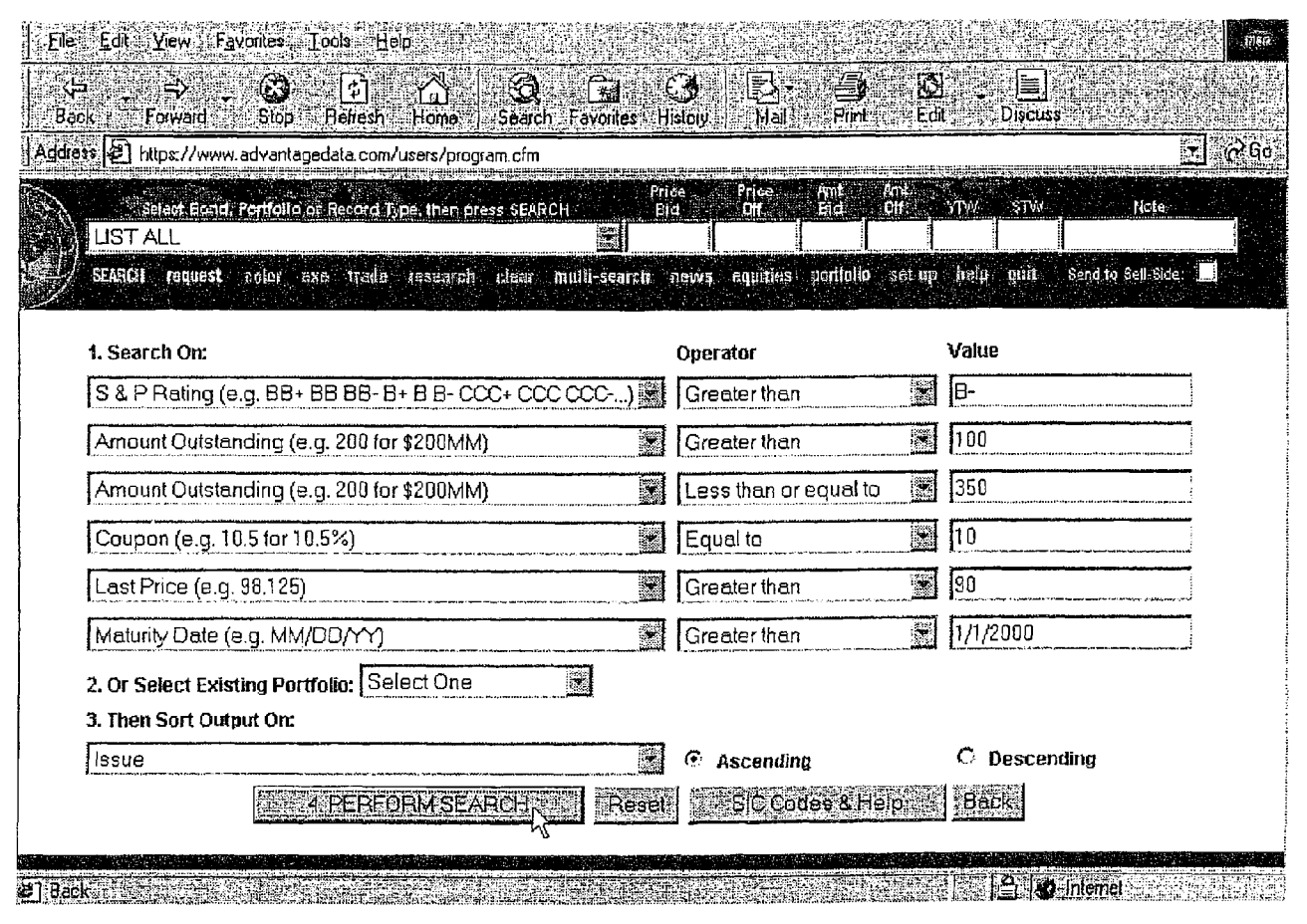

In the example of FIG. 4, the user elected to search: S & P Rating that is greater than B−; Amount Outstanding that is greater than 100; Amount Outstanding that is less than or equal to 350 (for $350 million); Coupon that is equal to 10; Last Price that is greater than 90; and Maturity Date that is greater than Jan. 1, 2000. The user also requested that the search be sorted on the "Issue" in an ascending manner. The user presses the perform search button to execute the search.

Once the user presses the search button, the controller means identifies the fields referenced in each of the search criteria. The controller means then searches the storage means for the securities that fall within the search parameters selected by the user. The results of the search are quickly displayed on the computer monitor and the user is able to view all available securities market information on the particular securities obtained from the query on the Multi-Search-Output Screen depicted in FIG. 6. The search is conducted in seconds after the user presses the search button. The Multi-Search-Output Screen provides the user with all the available security market information concerning those securities that were within his/her search criteria, including Issue, Collateral Type, Last Price, Last YTW, Last STW, Last Source, SIC Code, SIC Description, Amount Issued (M), Amount Outstanding (M), Announcement Date, First Settlement Date, Months Since Issuance, Interest Accrue Date, First Coupon Date, Maturity Date, Months to Maturity, Moody's Rating, S&P Rating, DCR Rating, Fitch, Price at Issuance, Yield at Issuance, Spread at Issuance, Underwriter, Issuer, 144A/Public, Coupon, Coupon Frequency, Coupon Type, Callable, Market Issued, Exchange, Nominal Value, Currency, Tax Status, Day/Count, Refunding Date, Current Call Date, Current Call Price, Next Call Date, Next Call Price, Put Feature, Cusip and others. In this example, the securities are displayed in alphabetical order as selected by the user in the Multi-Search-Output Screen.

From any of the above-mentioned screens, users may select to cut and paste the displayed data from any search into a spreadsheet (e.g. Microsoft Excel, PowerPoint, Word, Access or similar program) and create relative value "comp. sheets" or research pieces. These spreadsheets may be forwarded to other users or stored on the client user's hard drive.

From the Main Screen or the Individual Security Search Mode, users may also select the "portfolio option" to create or update their own portfolios. If a user chooses this option, the user is then transported to the Portfolio Creation Screen shown in FIG. 7. Here, users may create portfolios and retrieve information concerning their portfolios without having to type in bond identification numbers, issue names, coupon nor maturity. Users can simply click on the securities that make up their own portfolio, thereby minimizing the amount of time and effort needed to create and maintain their portfolios. Users are also able to modify or delete their portfolios as needed.

Concerning the display of portfolio information, once a user selects his or her portfolio, the latest information within the storage system concerning the securities in the selected portfolio is automatically obtained and displayed on the user's screen.

Figure 7:
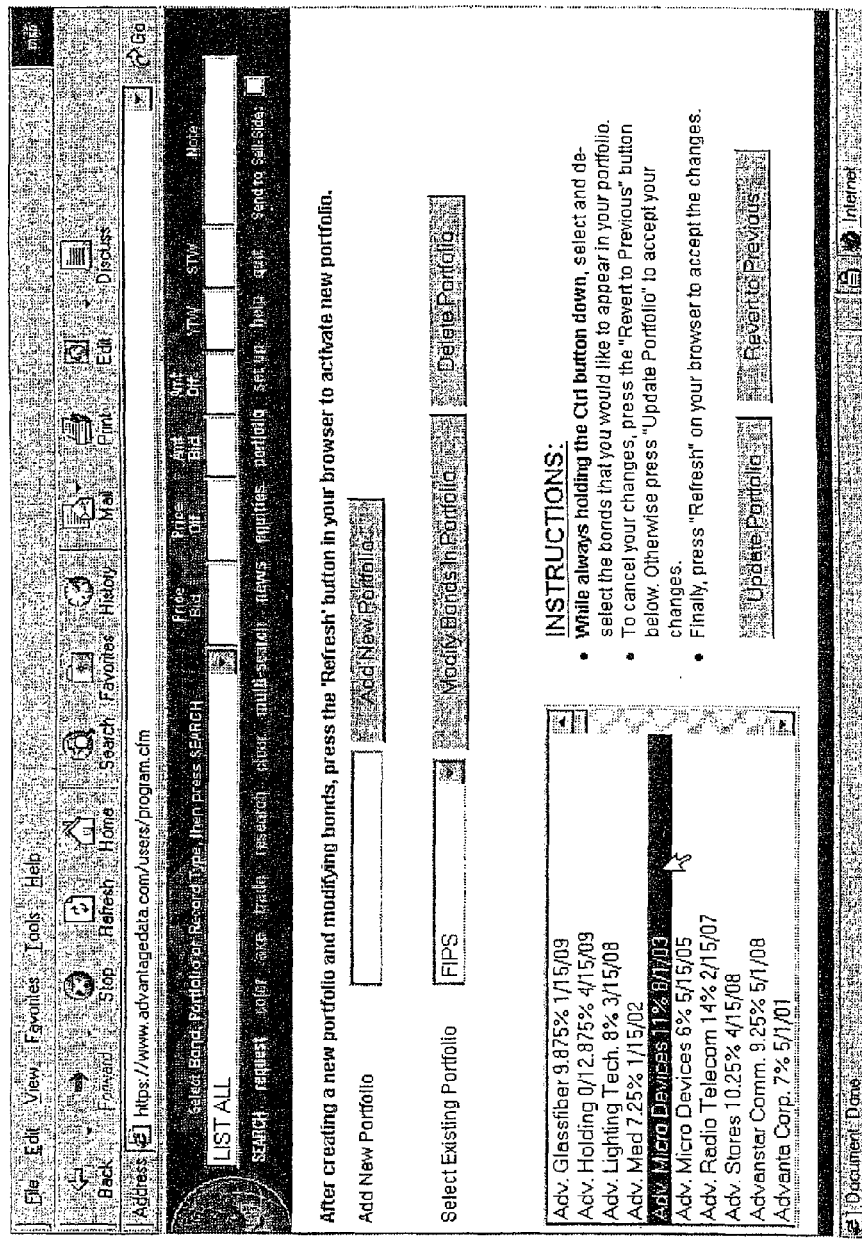
FIG. 7 is a computer monitor screen depicting the Portfolio Creation Screen.

In the example in FIG. 7, the user selected an existing portfolio, FIPS. The user has the ability to either add a new portfolio, modify the securities in the portfolio, or delete the portfolio. Portfolio data is stored within the storage system and available to the user and other member's of the user's group. Only information regarding which securities make up the portfolio need be stored; pricing and other information are retrieved from the central storage system immediately after the user selects the portfolio and presses search.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of providing an on-line interactive computer price discovery system, the method comprising:
   receiving, by a processor of a computing device, securities market information from two or more external sources, wherein securities market information from each external source is provided in a real-time data feed, time-delayed data feed, or batch data feed;
   receiving, by the processor, securities market information from one or more users of the interactive computer price discovery system, wherein information received from the one or more users includes data identifying users with whom the information provided may be shared;
   storing, by the processor, in a database, the securities market information received from two or more external sources and the securities market information received from one or more users of the interactive computer price discovery system;
   receiving, by the processor, a query for securities market information related to one or more securities, wherein the query is associated with a user of the system and includes a securities identifier;
   retrieving, by the processor, from the database, securities market information responsive to the query, wherein the retrieved securities market information includes the securities market information received from two or more external sources and the securities market information received from one or more users of the interactive computer price discovery system, and wherein the retrieved securities market information comprises one or more members selected from the group consisting of:
   securities data, a price, a price source identifier, a price source date, price source data, source identity information, price time information, permitted price user identifiers, price user data, and price user identifier information;
   providing, by the processor, for display on a graphical user interface, the retrieved securities market information, wherein the retrieved securities market information provided for display on a graphical user interface is updated as securities market information responsive to the query is received from external sources and users of the system.

2. The method of claim 1, comprising: updating the retrieved securities market information automatically as data is received from users and external sources.

3. The method of claim 1, wherein the securities market information further comprises one or more members selected from the group consisting of: available pricing, yield, spread, research notes, amount of bid and offer, yield to worst, and spread to worst.

4. The method of claim 1, comprising: providing, by the processor, the retrieved securities market information to other users in real-time in response to a request of a second user.

5. The method of claim 1, comprising: sorting, by the processor, the portion of the retrieved securities market information provided for display on the graphical user interface in at least one of an ascending or descending manner.

6. The method of claim 1, wherein said database comprises a single database.

7. The method of claim 1, wherein said processor comprises one processor.

8. The method of claim 1, wherein the retrieved securities market information provided for display on the graphical user interface is updated by continuously querying the database.

9. A method of claim 1, wherein the external sources include one or more members selected from the group consisting of pricing services, financial market sources, market reports, pricing firms, and research firms.

10. A method of claim 1, wherein the instructions, when executed, further cause the processor to store, in the database, market securities information received from one or more external sources or one or more users of the interactive computer price discovery system.

11. A method of claim 1, wherein the retrieved securities market information provided for display on a graphical user interface is updated in real time as securities market information responsive to the query is received from external sources and users of the system.

12. An on-line interactive computer price discovery system comprising:
   a processor; and
   a non-transitory computer readable medium storing instructions thereon wherein the instructions, when executed, cause the processor to:
      receive a query for securities market information related to one or more securities, wherein the query is associated with a user of the system and includes a securities identifier;
      retrieve, from a database, securities market information responsive to the query, wherein the retrieved securities market information in the database includes:
         securities market information received from one or more external sources in at least one of real-time data feeds, time-delayed data feeds, and batch data feeds, and
         securities market information received from one or more users of the interactive computer price discovery system, wherein information received from the one or more users includes data identifying users with whom the information provided may be shared; and
      provide, for display on a graphical user interface, at least a portion of the retrieved securities market information, wherein the retrieved securities market information provided for display on a graphical user interface is updated as securities market information responsive to the query is received from external sources and users of the system.

13. A system of claim 12, wherein the external sources include one or more members selected from the group consisting of pricing services, financial market sources, market reports, pricing firms, and research firms.

14. The system of claim 12, wherein the retrieved securities market information provided for display on a graphical user interface is updated in real time.

15. The system of claim 12, wherein the retrieved securities market information provided for display on the graphical user interface is updated by continuously querying the database.

16. A system of claim 12, wherein the instructions, when executed, further cause the processor to update the retrieved securities market information automatically as data is received from users.

17. A system of claim 12, wherein the securities market information further comprises one or more members selected from the group consisting of: securities data, a price, a price source identifier, a price source date, price source data, source identity information, price time information, permitted price user identifiers, price user data, and price user identifier information, available pricing, yield, spread, research notes, amount of bid and offer, yield to worst, and spread to worst.

18. A system of claim 12, wherein the database comprises a single database.

19. A system of claim 12, wherein the processor comprises one processor.

* * * * *